United States Patent

[11] 3,576,338

| [72] | Inventor | Emmett J. Horton |
| | | Dearborn, Mich. |
| [21] | Appl. No. | 878,124 |
| [22] | Filed | Nov. 19, 1969 |
| [45] | Patented | Apr. 27, 1971 |
| [73] | Assignee | Ford Motor Company |
| | | Dearborn, Mich. |

[54] DOOR EDGE GUARD
4 Claims, 2 Drawing Figs.

[52] U.S. Cl.................................................. 292/213,
292/1, 49/462
[51] Int. Cl................................................. E05c 3/28
[50] Field of Search........................................... 296/152,
(Inquired); 267/139, 140, 141; 293/62, 89, 162,
54; 49/462, 56; 292/1, 213

[56] References Cited
UNITED STATES PATENTS
3,473,264 10/1969 Holka............................ 49/462

Primary Examiner—Richard E. Moore
Attorneys—John R. Faulkner and Roger E. Erickson ABSTRACT: An edge guard mechanism for an exposable edge of a vehicle door. A protective bumper is extendable outwardly from the edge of the door into a protective position when the door is open. The bumper is mounted on a stem which is actuated by a cam means mounted to and movable with a movable portion of the door latch mechanism.

PATENTED APR 27 1971 3,576,338

INVENTOR.
EMMETT J. HORTON
BY JOHN R FAULKNER
ROGER E ERICKSON
ATTORNEYS

DOOR EDGE GUARD

BACKGROUND AND SUMMARY OF THE INVENTION

One of the most frequently damaged painted areas on an automotive vehicle body is the outer panel and the exposed edge of the vehicle doors. For example, paint chipping and scratching is caused in congested parking lots and garages when vehicle doors are opened and bump the sides of the adjacent vehicles or garage walls. The situation is aggravated by the fact that most vehicle doors have spring-biased hold-open positions which in effect tend to urge the edge of the opening vehicle door into engagement with adjacent objects.

Molding-type strip edge guards are available and provide a certain degree of protection against chips on the outside surfaces of the doors. These strips, however, generally do not protect an adjacent car not similarly equipped with a molding strip-type edge guard.

It is a purpose of this invention to provide a door edge guard mechanism which prevents damage to a vehicle door outer edge when the door is being opened and which also protects adjacently parked cars from the opening door. It is also a purpose of this invention to provide a door edge guard mechanism which may be used in combination with a plastic molding strip-type door guard to provide more complete protection from paint damage to both the car incorporating the invention and to cars parked adjacent to it. It is a further purpose of the invention to provide a door edge guard mechanism which when the door is open protrudes beyond the door outer surface and the door edge and provides a cushioned surface separating the door edge from adjacent objects.

A door guard mechanism constructed in accordance with this invention is used in combination with a door latch mechanism having a rotatable or pivotal latch element for latching and unlatching the vehicle door. This guard mechanism comprises a door edge protective member movably mounted to the door adjacent its outer free end, a cam surface mounted to a rotatable portion of a latch mechanism being movable therewith and engageable with a portion of the protective member so that the protective member is cammed outwardly from the other surface of the vehicle door into a protective position upon displacement of the rotatable portion into a latch release position.

DETAILED DESCRIPTION OF A PREFERRED EMBODIMENT

Figure 1:
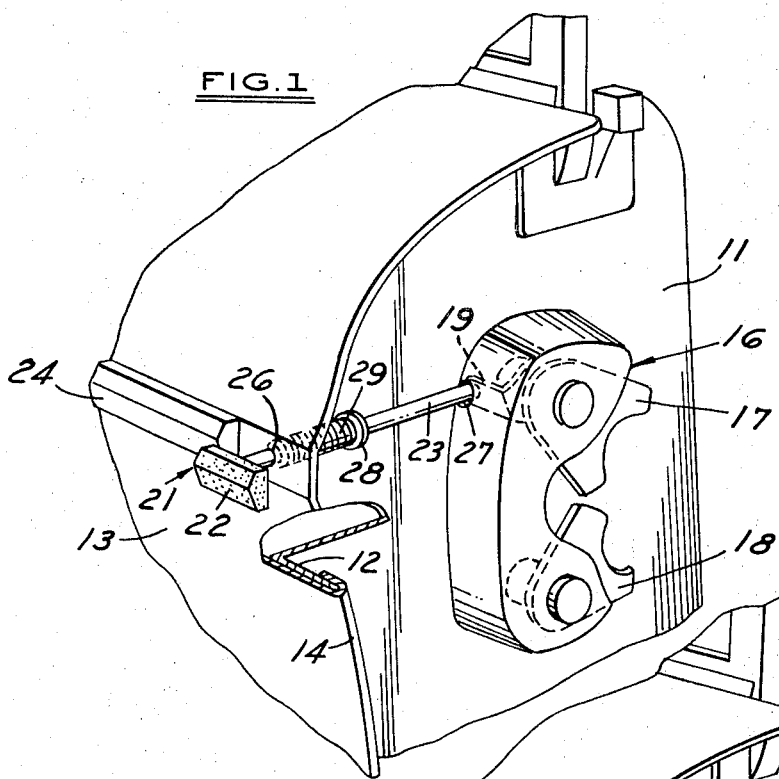
FIG. 1 is a perspective view with a section broken away of a door edge guard mechanism mounted on the free end wall of a vehicle door. The mechanism is shown in an extended position with the door latch in its open position.

Before explaining in detail the door edge guard mechanism embodying the present invention, a brief explanation of the environment in which it is to be used will help in understanding its features. A conventional vehicle door is hinged at one end (not shown) for swinging movement about a substantially vertical hinge axis. The other end of the door comprises a free end or jamb facing wall 11 which terminates in a hem flange 12 to which the outer panel or outer skin 13 of the door is attached. A terminal edge 14 of the outer panel 13 is usually rolled over the edge of the flange 12. In a closed position of the door, see FIG. 2, the free end wall 11 faces a corresponding end wall (not shown) of a body pillar or other structural member framing the body opening in which the door is mounted. When the door is fully closed, outer panel 13 of the door is aligned with other outer panels (not shown) of the vehicle body.

The function of the door edge mechanism of the present invention is to protect the terminal edge 14 against damage to itself and damage to the body of an adjacent vehicle with which it might come in contact as the door is opened. It is desirable that the door edge guard mechanism be in a concealed or retracted position when the door in which it is mounted in a closed position.

The door edge guard mechanism of the present invention preferably is to be used in combination with a latch mechanism 16 having pivoted latch elements. Such a latch mechanism may include a pair of reciprocably pivotal latch elements or jaws 17 and 18, shown in FIG. 1 of the drawings in an open or unlatched relationship and in FIG. 2 in a closed or latched relationship. U.S. Pat. No. 2,987,336 gives a detailed description of a similar latch mechanism.

The door guard mechanism has two main components. The first is a cam member 19 which is fixed to one of the pivoted jaws 17 or 18 of the latch mechanism for movement therewith. The second is a protective member 21 which includes a cushioned bumper 22 coupled to a stem 23 engageable with the cam member. As shown in FIG. 2, when in a closed position the bumper 22 forms an aligned section of the body side molding strip 24. The stem 23 is slidably positioned adjacent the free end wall of the door 11 within a pair of guides 26 and 27 (see FIG. 1). The end wall hem flange 12 and terminal edge portion 14 have an opening formed therein to function as the outer guide 26. An opening in the latch case functions as the inner guide 27. An abutment ring 28 is fixed to the stem and engages one end of a compression spring 29 which at its other end engages the inside surface of the hem flange 12. The spring urges the protective member into a retracted position against the cam surface.

When the door is in a closed position, as shown in FIG. 2, the jaws of latch mechanism 16 are in a substantially vertical position forming an enclosure 31 which receives a striker pin (not shown) mounted on the door pillar. The protective member 21 including the bumper 22 is then in a retracted position essentially flush with the molding 24 mounted on the body or door outer panel 13.

Figure 2:
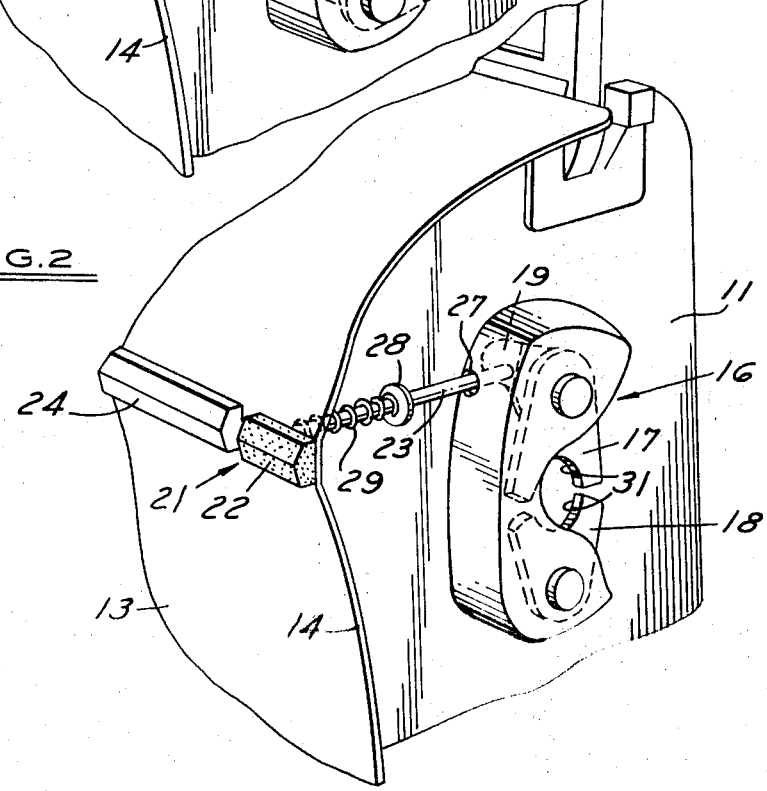
FIG. 2 is a perspective view showing the guard mechanism in a retracted position as would be the case when the vehicle door is closed.

In operation, upon release of the latch mechanism 16 the latch elements or jaws 17 and 18 are pivoted in a conventional manner about their respective axes from the position of FIG. 2 to the position of FIG. 1. The cam member 19 rigidly mounted to the upper jaw 17 moves with it and cams the protective member outwardly so the bumper 22 extends from the outer surface of the door panel 13. The bumper thus provides protection to the door edge 14 and to the door panels of adjacent cars.

Modifications and alterations will occur to those skilled in the art which are included in the scope of the following claims.

I claim:

1. An edge guard mechanism for the outer free edge wall of a vehicle door hingedly mounted to a vehicle body, the vehicle door including a latch mechanism having a pivotal latch element being movable to door latched or unlatched positions, said edge guard mechanism comprising:
    a door edge protective member movably mounted to said door adjacent the outer free end thereof,
    a cam element mounted to the pivotal latch element of the latch mechanism and movable therewith,
    cam engageable means on said protective member engageable with said cam element,
    said cam element being operative to cam said protective member outwardly of the outer free edge wall of the vehicle door into a protective position upon displacement of said latch element into unlatched position.

2. A door edge guard mechanism according to claim 1, in which:
    a spring means engages said protective member and urging the latter into engagement with said cam surface.

3. A door edge guard mechanism according to claim 2, in which:
    the protective member includes a bumper and a stem,
    one end of said stem being the cam engageable means,
    the bumper is formed of an elastomeric material.

4. An edge guard mechanism for the outer free edge of a vehicle door hingedly mounted to a vehicle body, the vehicle door including a latch mechanism mounted on said vehicle door having at least one pivotal jaw movable to latched and unlatched positions, said edge guard mechanism comprising:

a door edge protective member including an elastomeric bumper and a stem, guide means slidably engaging said stem and movably retaining said protective member adjacent the free edge wall of said vehicle door, said pivotal jaw of said latch mechanism having a cam means connected thereto for movement therewith, said stem being engageable at one end with said cam means for movement thereby, abutment means on said stem, compression spring means encompassing said stem, the ends of said spring means engaging said abutment means and a portion of the vehicle door, said spring means biasing said stem toward engagement with said cam means and said bumper into a retracted position, said bumper being movable outwardly from the vehicle door upon said pivotal jaw being moved to an unlatched position, and said bumper being retractable toward the vehicle door upon said pivotal jaw being moved to a latched position.